United States Patent
Kumar et al.

(10) Patent No.: US 12,436,957 B1
(45) Date of Patent: Oct. 7, 2025

(54) CONTEXT-SPECIFIC QUERY RESPONSE PLATFORM USING LARGE LANGUAGE MODELS

(71) Applicant: Bank of America Corporation, Charlotte, NC (US)

(72) Inventors: Samrendra Kumar, Perumbakkam (IN); Karthik Mohan, Scarborough (CA); Frenchy George Thomas, Chennai (IN); Rohit Khanna, Cranbury, NJ (US); Leslie Dias, West Windsor, NJ (US); Winnie Chacko, Dix Hills, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/785,964

(22) Filed: Jul. 26, 2024

(51) Int. Cl.
*G06F 16/242* (2019.01)
*G06F 16/245* (2019.01)
*G06F 16/2453* (2019.01)
*G06F 16/2457* (2019.01)

(52) U.S. Cl.
CPC .... *G06F 16/24575* (2019.01); *G06F 16/2425* (2019.01); *G06F 16/24539* (2019.01)

(58) Field of Classification Search
None
See application file for complete search history.

(56) References Cited

U.S. PATENT DOCUMENTS

| | | | |
|---|---|---|---|
| 9,318,108 B2 | 4/2016 | Gruber et al. | |
| 11,960,515 B1 * | 4/2024 | Pallakonda | G06F 16/3329 |
| 11,995,411 B1 | 5/2024 | Qadrud-Din et al. | |
| 12,033,258 B1 | 7/2024 | Sohail et al. | |
| 12,044,116 B1 | 7/2024 | Dyngosz et al. | |
| 12,045,269 B2 | 7/2024 | Cook | |
| 12,045,270 B2 | 7/2024 | Ferreira Lima et al. | |
| 12,045,288 B1 | 7/2024 | Barut et al. | |
| 12,045,300 B2 | 7/2024 | Gustavson et al. | |
| 12,045,437 B2 | 7/2024 | Ellis et al. | |
| 12,045,861 B2 | 7/2024 | Raviv | |
| 12,047,334 B1 | 7/2024 | Derza | |
| 12,047,649 B2 | 7/2024 | Nolan et al. | |
| 2018/0052884 A1 * | 2/2018 | Kale | G06F 16/242 |
| 2018/0052913 A1 * | 2/2018 | Gaskill | G06F 16/3344 |
| 2024/0127002 A1 | 4/2024 | Newman et al. | |
| 2024/0202464 A1 | 6/2024 | Poirier et al. | |
| 2024/0211686 A1 | 6/2024 | Davis | |
| 2024/0220525 A1 | 7/2024 | Baird et al. | |
| 2024/0233716 A1 | 7/2024 | Choi et al. | |
| 2024/0241897 A1 | 7/2024 | Wang et al. | |

(Continued)

*Primary Examiner* — Son T Hoang
(74) *Attorney, Agent, or Firm* — Banner & Witcoff, Ltd.

(57) ABSTRACT

A query response platform may train a large language model to output query responses based on user queries. The platform may receive user queries. The platform may generate query prompts and query responses using the large language model. The platform may receive query feedback corresponding to whether user queries were satisfied. The platform may generate alternative responses based on query feedback. The platform may output a graphical representation corresponding to the query response. The platform may send and/or receive query information corresponding to a user query to third-party devices. The platform may update the large language models based on query information.

20 Claims, 12 Drawing Sheets

(56) References Cited

U.S. PATENT DOCUMENTS

| | | |
|---|---|---|
| 2024/0242037 A1 | 7/2024 | Heller et al. |
| 2024/0242154 A1 | 7/2024 | Jindal et al. |
| 2024/0354503 A1* | 10/2024 | Baruch ................. G06F 16/345 |
| 2025/0045314 A1* | 2/2025 | Madnani ............. G06F 16/3329 |
| 2025/0068625 A1* | 2/2025 | Currell ................. G06F 16/243 |
| 2025/0068665 A1* | 2/2025 | Chandel ................ G06F 16/338 |
| 2025/0086952 A1* | 3/2025 | Wu ........................ G06F 16/33 |
| 2025/0094456 A1* | 3/2025 | Gu ...................... G06F 16/3329 |

\* cited by examiner

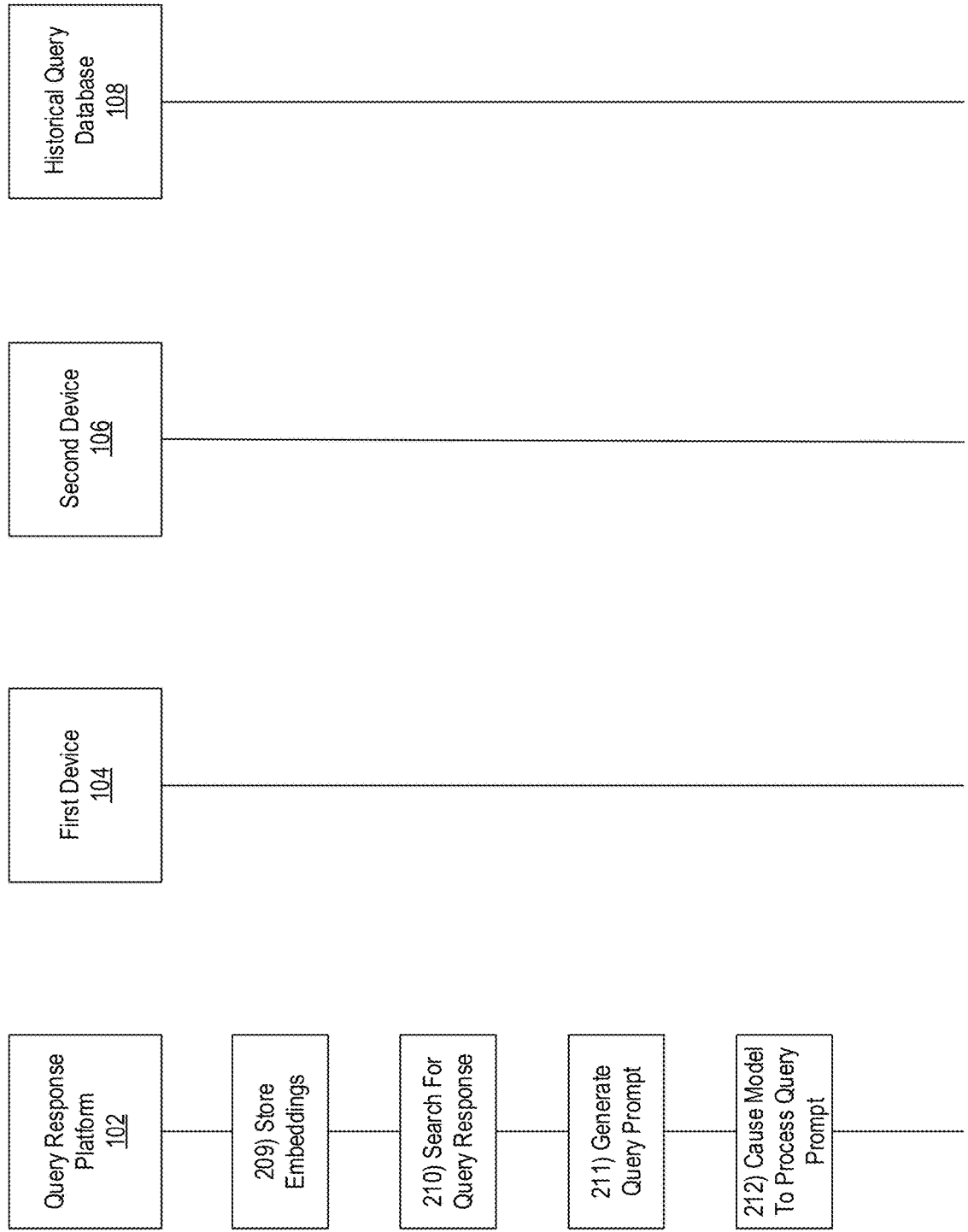

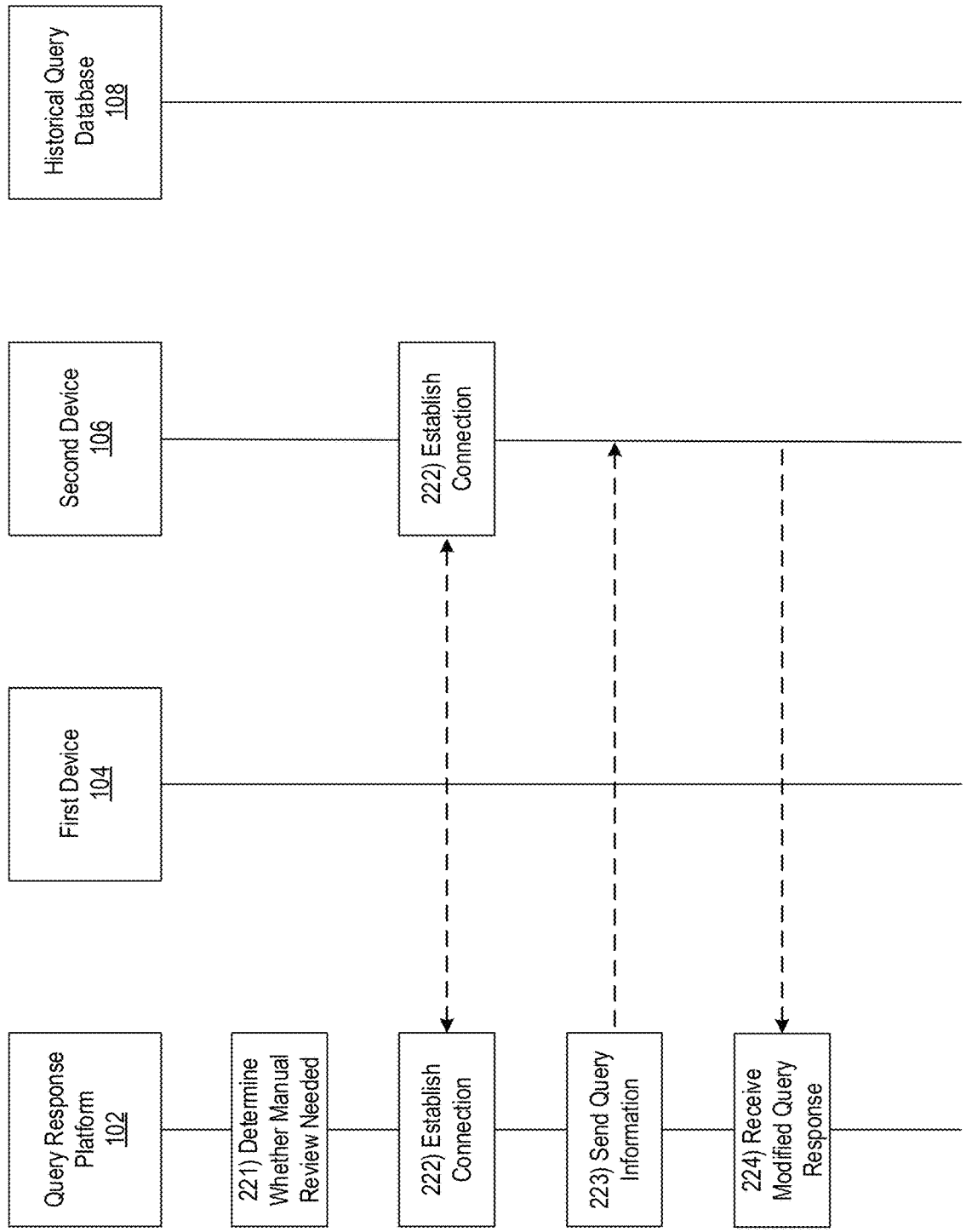

CONTEXT-SPECIFIC QUERY RESPONSE PLATFORM USING LARGE LANGUAGE MODELS

BACKGROUND

Aspects described herein are related to a context-specific query response platform using large language models. In some instances, entities such as an enterprise organization (e.g., a financial institution, and/or other institutions) may provide one or more applications, services, or the like to fulfill user queries and/or perform other functions. For example, enterprise organizations may respond to user queries related to a particular sector, industry regulations, and/or other topics. Conventional methods and/or systems of responding to user queries for certain topics may require that organization members (e.g., employees of the enterprise organization) manually answer user queries (e.g., due to factors such as complexities in the conditions related to the query, industry regulations, and/or other factors). Conventional systems may respond to user queries using manual processes that are time-consuming, prone to human error, and struggle to keep pace with the volume of data and the speed of regulatory changes related to the user queries. In these examples, query responses may undergo a lengthy process of clarification and validation, causing delays. Query responses may also produce inconsistent answers, for example, based on input from multiple different organization members. Thus, there exists a need for a query response platform that increases efficiency, consistency, and lowers the resource requirements of providing context-specific query responses.

SUMMARY

Aspects of the disclosure provide effective, efficient, scalable, and convenient technical solutions that address and overcome the technical problems associated with current methods of user query response. In accordance with one or more arrangements of the disclosure, a computing platform with at least one processor, a communication interface, and memory storing computer-readable instructions may train, based on historical query information, a query response model. Training the query response model may configure the query response model to output query responses based on input of query prompts. The computing platform may receive, from a user device, a user query. The computing platform may generate, based on one or more historical embeddings, an embedding corresponding to the user query. The computing platform may generate a query prompt corresponding to the user query. The query prompt may comprise the embedding corresponding to the user query and/or a plurality of embeddings corresponding to a subset of the historical query information. The computing platform may execute, based on the query prompt, the query response model to output a query response. The computing platform may send, to the user device, the query response. Sending the query response to the user device may cause a display of a user interface including the query response on a display of the user device. The computing platform may identify, based on sending the query response, a status of the query response indicating whether the query response satisfies the user query. In response to identifying the status of the query response, the computing platform may store, based on identifying that the query response satisfies the user query, to a long-term memory component, the query response. In response to identifying the status of the query response, the computing platform may output, based on identifying that the query response does not satisfy the user query, an alternative query response. The computing platform may update, based on the query response and the status of the query response, the query response model.

In one or more examples, the computing platform may output, to a second user device and based on identifying that the status of the query response indicates that the query response does not satisfy the user query, the query prompt. The computing platform may receive, from the second user device, a modified query response. The computing platform may output, to the user device, the modified query response. In one or more examples, the computing platform may identify, based on identifying that the status of the query response indicates that the query response does not satisfy the user query, the alternative query response. Identifying the alternative query response may comprise selecting, from one or more historical query responses stored at the long-term memory component, a historical query response corresponding to the user query. In one or more examples, the computing platform may maintain, at the long-term memory component, one or more historical query responses. Executing the query response model to output the query response may comprise identifying, based on one or more stored correlations to the one or more historical query responses, a historical query response corresponding to the user query.

In one or more examples, the subset of the historical query information may comprise one or more of text inputs, chat logs, photographic images, audio files, historical data logs, or digital files. In one or more examples, the user query may comprise one or more of text inputs, chat logs, photographic images, audio files, or digital files. In one or more examples, the computing platform may maintain at a long-term memory component, one or more historical embeddings corresponding to historical user queries, and/or one or more historical query prompts. Generating the embedding corresponding to the user query may comprise selecting, from the one or more historical embeddings, a historical embedding corresponding to the user query. Generating the query prompt may comprise selecting from the one or more historical query prompts, a query prompt corresponding to the historical embedding. In one or more examples, the computing platform may generate, based on the historical query information, the one or more historical embeddings. The computing platform may identify, based on the one or more historical embeddings, one or more categories of historical query information. The computing platform may store, at a long-term memory component and based on the one or more categories of historical query information, one or more correlations between the one or more categories and the one or more historical embeddings.

In one or more examples, identifying the status of the query response may comprise causing, based on outputting the query response, display of a user interface at the user device, receiving, from the user device and via the user interface, user feedback, and/or identifying, based on the user feedback, whether the query response satisfies the user query. In one or more examples, the computing platform may receive, from one or more sources, industry information. Industry information may comprise one or more of policy information corresponding to one or more regulatory entities, and/or cyber security information. The computing platform may update, based on the industry information, the query response model. In one or more examples, the query response may comprise information responsive to the user query. Information responsive to the user query may comprise at least one of account information, regulatory information, asset information and/or asset information. The query response may comprise a visual representation of the query response. The visual representation may comprise one or more of a text output, an email, a chat response, a graphical representation, an audio file, and/or a data log.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for a context-specific query response platform using large language models in accordance with one or more example arrangements;

DETAILED DESCRIPTION

Figure 1A:
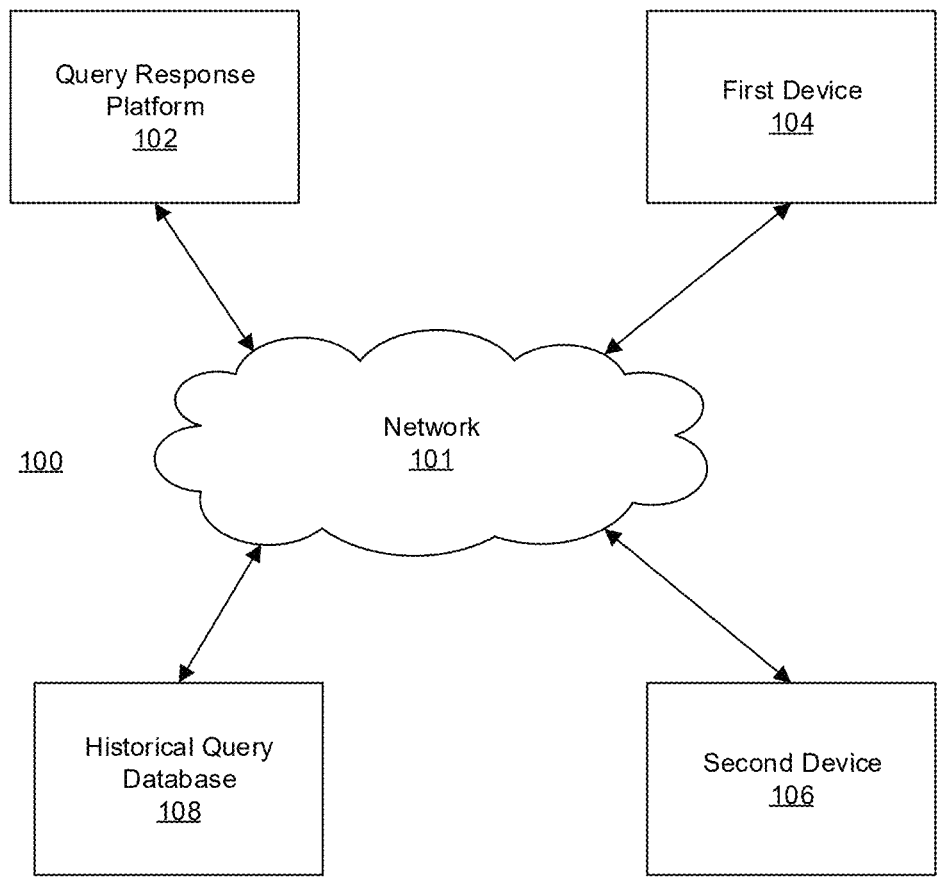
FIGS. 1A-1B depict an illustrative computing environment for a context-specific query response platform using large language models in accordance with one or more example arrangements.

In the following description of various illustrative arrangements, reference is made to the accompanying drawings, which form a part hereof, and in which is shown, by way of illustration, various arrangements in which aspects of the disclosure may be practiced. In some instances, other arrangements may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to providing a context-specific query response platform using large language models. In some instances, entities such as an enterprise organization (e.g., a financial institution, and/or other institutions) may provide one or more applications, services, or the like to fulfill query requests. In some examples, generating responses to the query requests may require a lengthy process of clarification and validation, causing delays. Query responses may also produce inconsistent answers. Thus, there exists a need for a query response platform that increases efficiency, consistency, and lowers the resource requirements of providing context-specific query responses as described herein.

Accordingly, in some instances, entities such as an enterprise organization may deploy, maintain, and/or otherwise utilize a query response platform as described herein. The query response platform may utilize large language models to output query responses in a manner that is more efficient and less resource-intensive than conventional methods. For example, the query response platform may train a query response model (e.g., a large language model, and/or other machine learning model) to output a context-specific query response based on historical query information (e.g., historical query responses, historical data logs, and/or other historical query information). The query response platform may receive a user query (e.g., text inputs, chat logs, photographic images, audio files, historical data logs, digital files, and/or other computer readable inputs). The query response platform may generate an embedding (e.g., a vector, memory unit, and/or other data structure) corresponding to historical embeddings. In some examples, embeddings may be stored in a long-term memory device based on one or more categories (e.g., a source of the embedding, a commercial market corresponding to the embedding, and/or other categories), indicators (e.g., a digital token, key, flag, packet header, and/or other identifier associated with the embedding), and/or the like. The query response platform may generate a query prompt corresponding to the user query. For example, the query response platform may generate, based on an embedding, a query prompt comprising information useful in determining a query response (e.g., historical embeddings corresponding to historical queries, market information reflecting economic activity, policy information corresponding to regulatory entities, cybersecurity information, and/or other information useful in determining a query response). The query response platform may cause the query response model to output a query response (e.g., a text output, graphical representation of data, audio file, computer readable file, and/or other user readable outputs) based on the query prompt. The query response platform may output a query response. The query response platform may identify whether the query response satisfies the user query. For example, the query response platform may identify and/or generate a query response status indicating whether the query response satisfies the user query. The status may be based on query response feedback from a user device. In some examples, the query response feedback may comprise test inputs, Boolean responses, and/or the like. In some examples, the query response platform may, based on the status of the query response, output an alternative query response (e.g., text output, graphical representation of data, audio file, computer readable file, and/or other user readable outputs). For example, based on a status indicating that the query response does not satisfy the user query, the query response platform may perform one or more actions to identify and output an alternative query response, as described further herein. The query response platform may store the query response to a long-term memory component. The query response platform may update the query response model based on the query response and/or status of the query response.

In some examples, the query response platform may maintain, at one or more long-term memory components, one or more historical query responses which the query response platform may use to cause the query response model to output a query response. The query response platform may access, recall, and/or otherwise utilize the stored historical query responses to determine query responses when a user query that is the same as, or similar to, a query corresponding to one or more historical query responses.

In some examples, the query response platform may receive user feedback. The query response platform may, based on the user feedback, identify the status of the query response. In some examples, the query response platform may provide an alternative query response based on the status of the query response. For example, the query response platform may output a query response (e.g., text output, graphical representation of data, audio file, computer readable file, and/or other user readable outputs) based on a status indicating that the query response did not satisfy the user query. In outputting the alternative query response, the query response platform may cause the query response model to output one or more alternative query responses by selecting a historical query response corresponding to the user query. Additionally or alternatively, the query response platform may identify whether one or more alternative responses may be available within the query response platform. For example, the query response platform may identify whether the query response platform has previously generated and stored a query response (e.g., using the query response model) corresponding to the user query. Based on identifying that a query response corresponding to the user query was previously generated and stored, the query response platform may identify that query response as an alternative query response. For example, the query response outputted may be one of multiple query responses that correspond to the user query. Based on the status indicating that the query response did not satisfy the user query, the query response platform may output one of the multiple query responses that correspond to the user query. For example, the query response platform may identify whether the alternative query response may affect the query response platform, based on whether the alternative query response contradicts historical query responses.

In some examples, the query response platform may, based on the status of the query response feedback, make available, to one or more additional and/or third-party devices, a user query and corresponding query response. For example, the query response platform may receive query response feedback indicating that a query response generated by the query response platform does not satisfy the user query. The query response platform may, after validating the query response feedback, identify that no alternative query response is stored at the query response platform. In these examples, the query response platform may make available, to one or more additional and/or third-party devices, the user query and corresponding query response in order to produce a context-specific query response, as described herein, that satisfies the user query. The query response platform may receive, from an additional and/or third-party device, a modified query response (e.g., text output, graphical representation of data, audio file, computer readable file, and/or other user readable outputs). The query response platform may output the modified query response.

These and various other aspects will be discussed more fully herein.

Figure 1B:
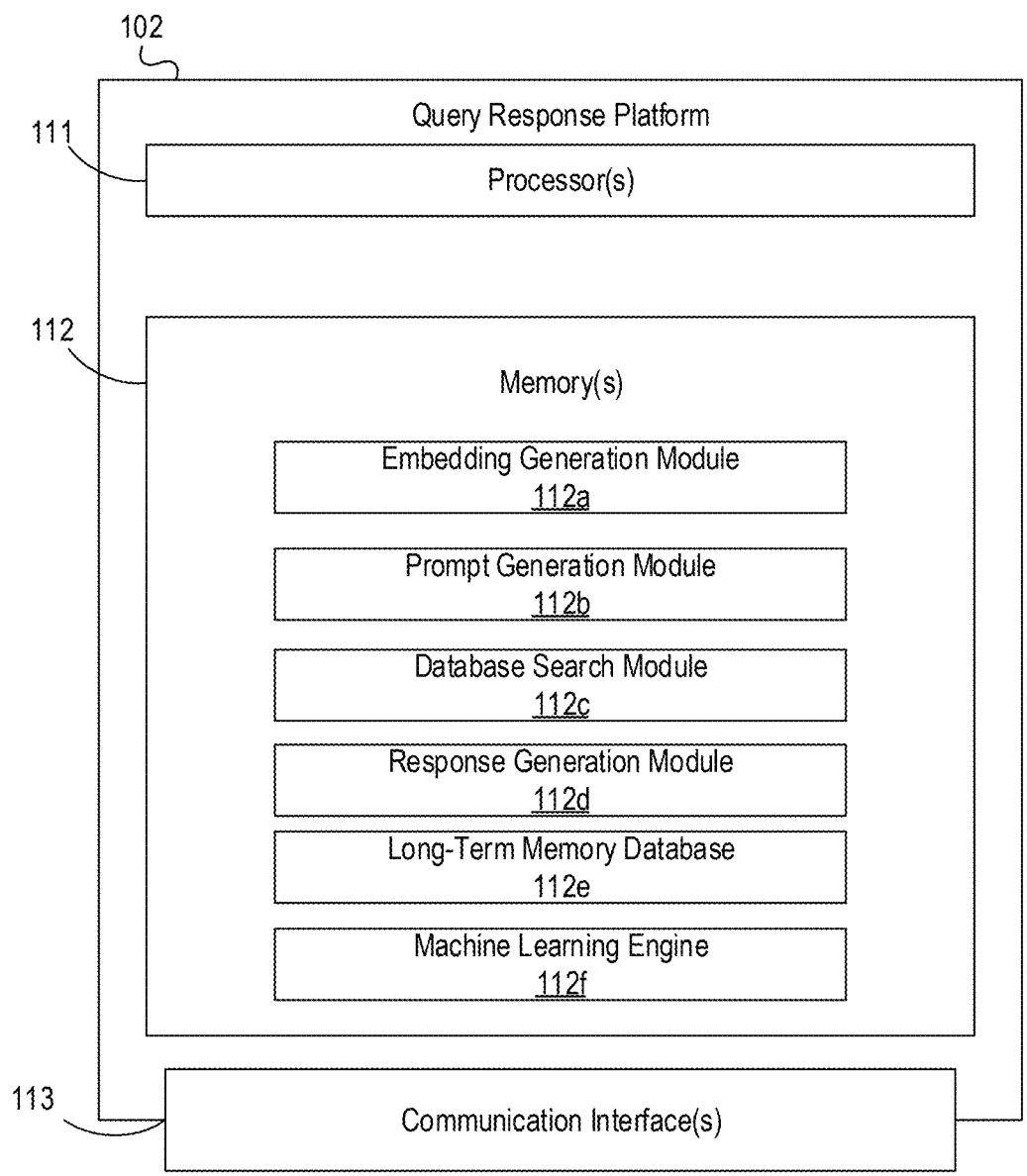

FIGS. 1A-1B depict an illustrative computing environment for a context-specific query response platform using large language models in accordance with one or more example arrangements. Referring to FIG. 1A, computing environment 100 may include one or more computer systems. For example, computing environment 100 may include a query response platform 102, a first device 104, a second device 106, a historical query database 108, and/or other computer systems.

As described further below, query response platform 102 may be a computer system that includes one or more computing devices (e.g., servers, laptop computer, desktop computer, mobile device, tablet, smartphone, and/or other devices) and/or other computer components (e.g., processors, memories, communication interfaces) that may be used to configure, train, and/or execute one or more machine learning models (e.g., a large language model, and/or other models). For example, the query response platform 102 may train a large language model to output query responses (e.g., text files, data logs, and/or other information responsive to a user query). The query response platform 102 may be managed by and/or otherwise associated with an enterprise organization (e.g., a financial institution, and/or other institutions) that may be associated with one or more additional systems (e.g., first device 104, second device 106, historical query database 108, and/or other systems). In one or more instances, the query response platform 102 may be configured to communicate with one or more systems (e.g., first device 104, second device 106, historical query database 108, and/or other systems) to generate one or more query responses, validate query response feedback, provide alternative query responses, train machine learning models, identify a query response status, display a user interface, and/or perform other functions.

The first device 104 may be a computing device (e.g., laptop computer, desktop computer, mobile device, tablet, smartphone, and/or other device) and/or other data storing or computing component (e.g., processors, memories, communication interfaces, databases) that may be used to transfer information between devices and/or perform other user functions (e.g., generate a user query, and/or the like). In some examples, the first device 104 may be associated with a particular user (e.g., an employee and/or a customer of the enterprise organization). In some instances, the first device 104 may be configured to communicate with one or more systems (e.g., query response platform 102, and/or other systems) as part of transmitting a message, sending a user query, and/or to perform other functions.

The second device 106 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer information between devices and/or perform other functions (e.g., display a user interface, receive user input, and/or other functions). For example, the second device 106 may be a computing device similar to the first device 104. In some examples, the second device 106 may be associated with a particular entity and/or organization (e.g., financial institutions, administrative/regulatory entities, and/or other entities/organizations). In some instances, the second device 106 may be configured to communicate with one or more systems (e.g., query response platform 102, and/or other systems) as part of generating a query response, displaying a user interface, and/or to perform other functions. In some instances, the second device 106 may be configured to display one or more graphical user interfaces (e.g., query response interfaces, and/or other interfaces).

Although two similar devices (first device 104 and second device 106) are depicted herein, any number of such devices may be used to implement the methods and arrangements described herein without departing from the scope of disclosure.

The historical query database 108 may be and/or otherwise include one or more computing devices (e.g., servers, server blades, and/or other devices) and/or other computer components (e.g., processors, memories, and/or other devices) that may be used to host, sort, identify, categorize, and/or otherwise validate a collection of information (e.g., a plurality of vectors, embeddings, and/or other data structures corresponding to historical user queries). The historical query database 108 may be synchronized across multiple nodes (e.g., sites, institutions, geographical locations, and/or other nodes) and may be accessible by multiple users (who may be, e.g., customers of an enterprise organization such as a financial institution, employees of an enterprise organization such as a financial institution). The information stored at the historical query database 108 may include information used to train machine learning models and/or components (e.g., historical query information, data log files corresponding to historical query responses, historical market information corresponding to historical user queries, and/or the like), and/or any additional information. In some instances, the historical query database 108 may be accessed by, validated by, and/or modified by any of, query response platform 102, second device 106, and/or other devices. Although shown as an independent database, in some instances, the historical query database 108 may be part of and/or otherwise integrated into the query response platform 102 without departing from the scope of the disclosure.

Computing environment 100 also may include one or more networks, which may interconnect query response platform 102, first device 104, second device 106, and historical query database 108. For example, computing environment 100 may include a network 101 (which may interconnect, e.g., query response platform 102, first device 104, second device 106, and historical query database 108).

In one or more arrangements, query response platform 102, first device 104, second device 106, and historical query database 108 may be any type of computing device capable of sending and/or receiving user queries and processing the user queries accordingly. For example, query response platform 102, first device 104, second device 106, and historical query database 108 and/or the other systems included in computing environment 100 may, in some instances, be and/or include server computers, desktop computers, laptop computers, tablet computers, or the like that may include one or more processors, memories, communication interfaces, storage devices, and/or other components. As noted above, and as illustrated in greater detail below, any and/or all of query response platform 102, first device 104, second device 106, and historical query database 108 may, in some instances, be special-purpose computing devices configured to perform specific functions.

Referring to FIG. 1B, query response platform 102 may include one or more processors 111, memory 112, and communication interface 113. A data bus may interconnect processors 111, memory 112, and communication interface 113. Communication interface 113 may be a network interface configured to support communication between query response platform 102 and one or more networks (e.g., network 101, or the like). Communication interface 113 may be communicatively coupled to the processors 111. Memory 112 may be communicatively coupled to the processors 111. Memory 112 may include one or more program modules having instructions that, when executed by the processors 111, cause the query response platform 102 to perform one or more functions described herein, and/or one or more databases (e.g., long-term memory database 112e, and/or the like) that may store and/or otherwise maintain information which may be used by such program modules and/or processors 111. In some instances, the one or more program modules and/or databases may be stored by and/or maintained in different memory units of query response platform 102 and/or by different computing devices that may form and/or otherwise make up query response platform 102. For example, memory 112 may have, host, store, and/or include an embedding generation module 112a, a prompt generation module 112b, a database search module 112c, a response generation module 112d, long-term memory database 112e, and a machine learning engine 112f and/or other modules and/or databases.

Embedding generation module 112a may have instructions that direct and/or cause the query response platform 102 to receive historical query information, generate embeddings, generate indicators and/or categories corresponding to embeddings, and/or perform other functions. Prompt generation module 112b may have instructions that direct or cause query response platform 102 to receive user queries, generate query prompts, output query prompts, and/or perform other functions. Database search module 112c may have instructions that direct and/or cause the query response platform 102 to search, based on a user query, historical query database 108, identify similar historical query responses, identify correlations between historical query responses, and/or other perform functions. Response generation module 112d may have instructions that direct and/or cause query response platform 102 to generate a query response, based on machine learning analysis, store a query response to a long-term memory component, and/or other perform functions. Long-term memory database 112e may have instructions that direct and/or cause query response platform 102 to store, in a cell architecture, the query responses, the query prompts, and/or perform other database functions. Machine learning engine 112f may have instructions that direct and/or cause the query response platform 102 to train, implement, and/or update one or more machine learning models, such as a query response model, and/or other machine learning models.

Although embedding generation module 112a, prompt generation module 112b. database search module 112c, response generation module 112d, long-term memory database 112e, and machine learning engine 112f, are depicted as separate modules herein, the instructions stored by these modules may be stored in any number of modules without departing from the scope of this disclosure.

Figure 2A:
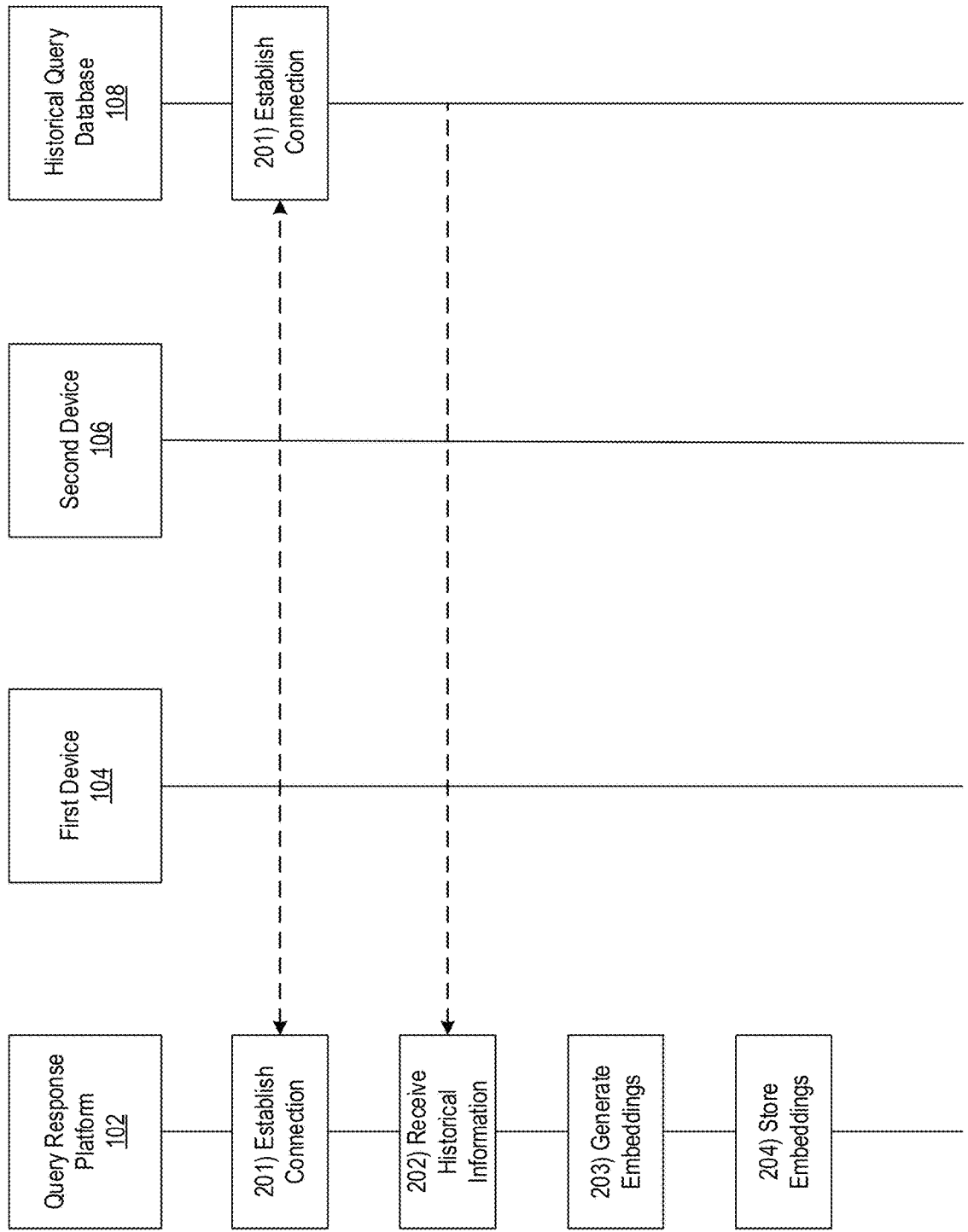

FIGS. 2A-2G depict an illustrative event sequence for a context-specific query response platform using large language models in accordance with one or more example arrangements. Referring to FIG. 2A, at step 201, the query response platform 102 may establish a connection with the historical query database 108. For example, the query response platform 102 may establish a first wireless data connection with the historical query database 108 to link the historical query database 108 to the query response platform 102 (e.g., in preparation for receiving historical information). In some instances, the query response platform 102 may identify whether or not a connection is already established with the historical query database 108. If a connection is already established with the historical query database 108, the query response platform 102 might not re-establish the connection. If a connection is not yet established with the historical query database 108, the query response platform 102 may establish the first wireless data connection as described herein.

At step 202, the query response platform 102 may receive historical query information. For example, the query response platform 102 may receive historical query information such as, for example, historical user queries, historical query responses, and/or other historical query information. The query response platform 102 may receive the historical query information from a database, such as, for example, historical query database 108, and/or other databases. In these examples, the query response platform 102 may receive the historical query information via communication interface 113 and/or while the first wireless data connection is established.

At step 203, the query response platform 102 may generate embeddings. For example, the query response platform 102 may transform historical query information into one or more embeddings (e.g., an encoded vector, a memory unit, and/or other data structures) in preparation for searching and/or storing historical query information. For example, the query response platform 102 may encode raw, unstructured data (e.g., historical query information) into a structured format. In some instances, the query response platform 102 may identify whether or not an embedding has been created for corresponding historical query information.

If an embedding has been created for corresponding historical query information, the query response platform 102 might not create a new embedding for the historical query information. Accordingly, step 203 may be optional.

At step 204, the query response platform 102 may store embeddings generated at step 203. The query response platform 102 may store the embeddings by uploading and/or otherwise providing all of the information comprising the embeddings to a long-term memory component (e.g., the historical query database 108, the long-term memory database 112e, and/or other long-term memory). In some instances, the query response platform 102 may store the embeddings by causing the historical query database 108 and/or the long-term memory database 112e to generate a cell architecture comprising the embeddings.

Figure 2B:
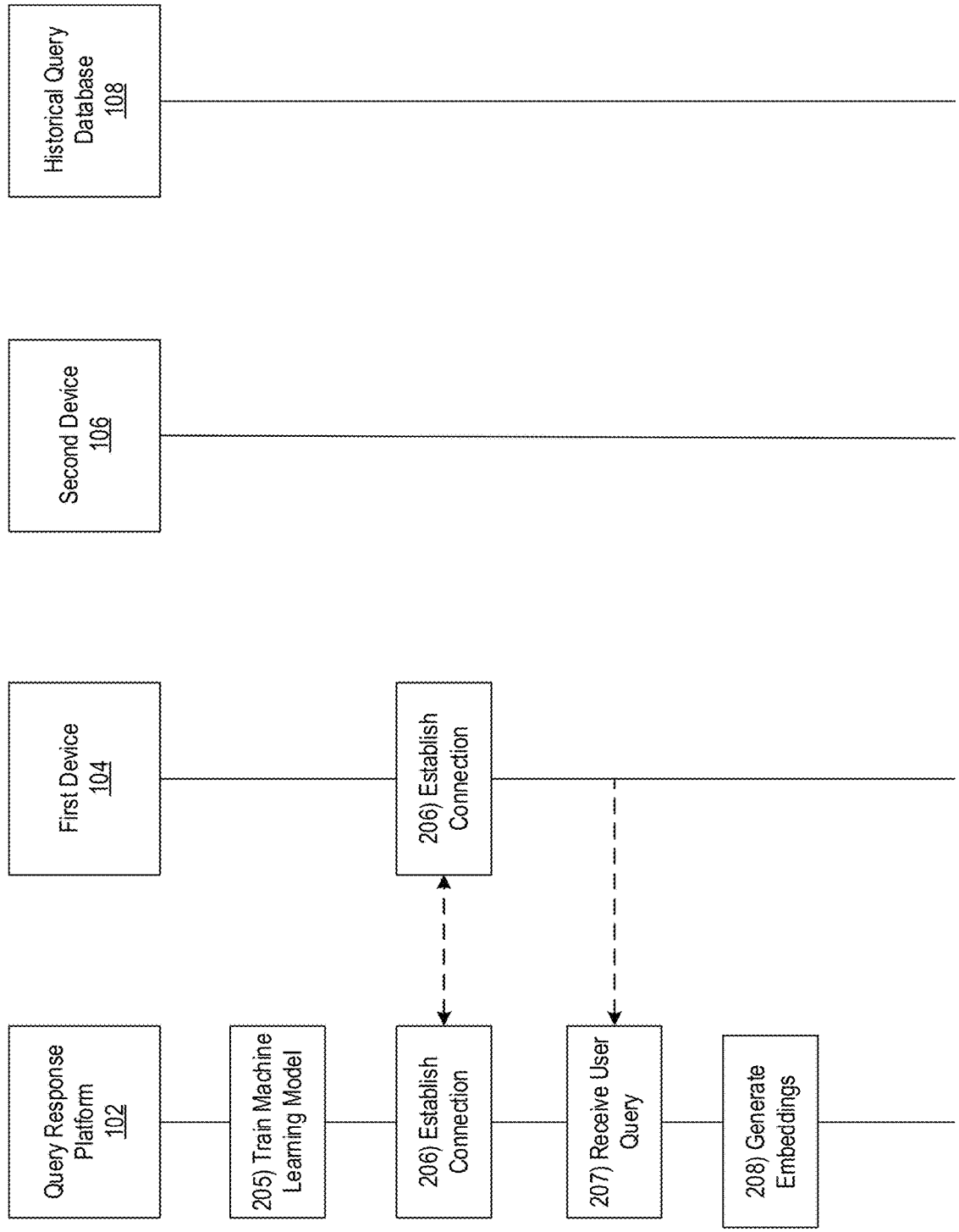

Referring to FIG. 2B, at step 205 the query response platform 102 may train a machine learning model. The query response platform 102 may for example, train a query response model, such as a large language model (LLM), to output query responses and/or display query response information based on input of a query prompt corresponding to a user query. For example, the query response platform 102 may configure and/or otherwise train the large language model based on historical query information corresponding to user queries that were fulfilled using conventional query response techniques as an initial training set to train the model to provide context-specific query responses using methods described herein. In some examples, the historical query information may be and/or comprise the historical query information received at step 202. Additionally, or alternatively, in some examples, the historical query information may be and/or comprise historical query information previously stored at the historical query database 108 (e.g., for training machine learning models) and accessed by the query response platform 102.

In some instances, to configure and/or otherwise train the query response model, the query response platform 102 may cause the query response model to process the historical query information by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques. In some examples, the techniques used to process the historical query information may be and/or comprise techniques for processing sets of data (e.g., historical query information) exceeding a threshold size (e.g., a number of bytes, or the like).

In some examples, in configuring and/or otherwise training the query response model, the query response platform 102 may cause the query response model to store one or more correlations between portions of the historical query information. In some arrangements, for example, the query response platform 102 may cause the query response model to store one or more correlations between historical user queries and historical query responses. For example, the query response platform 102 may cause the query response model to store correlations between, for example, a date, time, and/or other temporal information, market information, the function corresponding to the user query, and/or the like.

In configuring and/or otherwise training the query response model, based on causing the query response model to store the one or more correlations, the query response platform 102 may cause the query response model to output query responses based on the input of a user query. For example, the query response platform 102 may configure and/or otherwise train the query response model to output query responses for a user query based on the stored correlations. The query response model may be configured and/or otherwise trained to, based on the stored correlations, output a query response (e.g., a text notification, an email, a chat response, and/or other query responses) comprising information responsive to a user query (e.g., market information, regulatory information, account information, and/or other information responsive to a user query) for a user query that is similar to a historical user query corresponding to the one or more stored correlations. For example, the query response platform 102 may store a correlation between a historical user query requesting the growth rate of an economic asset (e.g., a stock value, or the like) over a period of time (e.g., January through March of a specific year) and a historical query response comprising a visual representation (e.g., a graph, chart, or the like) of the growth rate of the economic asset over the period of time. Accordingly, the query response platform 102 may cause the query response model to output, based on the stored correlation, a query response comprising the same visual representation based on receiving, as input, a user query requesting the growth rate of the same economic asset over the same period of time. Also or alternatively, the query response platform 102 may cause the query response model to output, based on the stored correlation, a query response comprising the same format (e.g., a visual representation) based on receiving, as input, a similar user query requesting, for example, the growth rate of a different economic asset for the same period of time.

At step 206, the query response platform 102 may establish a connection with the first device 104. For example, the query response platform 102 may establish a second wireless connection with the first device 104 to link the first device 104 to the query response platform 102 (e.g., in preparation for receiving a user query). In some instances, the query response platform 102 may identify whether or not a connection is already established with the first device 104. If a connection is already established with the first device 104, the query response platform 102 might not re-establish the connection. If a connection is not yet established with the first device 104, the query response platform 102 may establish the second wireless data connection as described herein.

At step 207, the query response platform 102 may receive a user query. For example, the query response platform 102 may receive a user query comprising information such as, for example, text inputs, chat logs, audio files, chat logs, digital files, and/or other user inputs. The query response platform 102 may receive the user query from a user device, such as, for example, first device 104, and/or other user devices. In these examples, the query response platform 102 may receive the user query via the communication interface 113 and/or while the second wireless data connection is established.

At step 208, the query response platform 102 may generate embeddings based on the user query. For example, the query response platform 102 may transform the user query into one or more embeddings. In some examples, in generating the embeddings, the query response platform 102 may divide subsets of information included in the user query into one or more separate embeddings. For example, based on a user query comprising a request to analyze a plurality of market trends and one or more text files, images, data tables, and/or other digital representations each of the market trends, the query response platform 102 may generate an embedding for each representation. In some examples, the query response platform 102 may generate a single embedding comprising all of the information included in the user query. In some instances, the query response platform 102 may identify whether or not an embedding has been created for the user query. If an embedding has been created for the user query, the query response platform 102 might not create a new embedding for the user query.

Referring to FIG. 2C, at step 209, the query response platform 102 may store embeddings generated at step 208. The query response platform 102 may store the embeddings by uploading and/or otherwise providing all of the information comprising the embeddings to a long-term memory component (e.g., the historical query database 108, the long-term memory database 112e, and/or other long-term memory). In some instances, the query response platform 102 may store the embeddings by causing the historical query database 108 and/or the long-term memory database 112e to generate a cell architecture comprising the embeddings. In some instances, the query response platform 102 may store the embeddings by causing a short-term memory component (e.g., vector cache and/or the like) to generate a cell architecture comprising the embeddings. In these examples, the query response platform may store the cell architecture at the long-term memory database 112e.

At step 210, the query response platform may search for query response. For example, the query response platform 102 may search one or more repositories of historical user queries and historical query responses (e.g., a long-term memory component, such as the historical query database 108, the long-term memory database 112e, and/or other long-term memory components) to identify whether a query response that answers the user query has previously been generated and/or stored by the query response platform 102. In identifying whether a query response exists, the query response platform 102 may utilize the database search module 112c, the query response model, and/or other programs or models to search the embeddings stored in steps 204 and 209 for historical user queries corresponding to the user query received in step 207. For example, the query response platform may use one or more search functions, applications, or the like to search for an embedding representing a historical user query comprising the same or similar information as the user query. Based on identifying a historical user query corresponding to the user query, the query response platform 102 may identify whether a historical query response corresponding to the identified historical user query is stored at the repository. For example, the query response platform 102 may cause the query response model to identify, based on one or more stored correlations used to train the model, a historical query response corresponding to the historical user query. Also or alternatively, the query response platform 102 may utilize correlations, tags, and/or other identifiers corresponding to the identified historical user query to identify a corresponding historical query response. Based on identifying a stored historical query response corresponding to the user query, the query response platform 102 may proceed to step 215 and output a query response. If, in searching the embeddings, the query response platform 102 does not identify a stored historical query response corresponding to the user query, the query response platform 102 may continue to step 211.

At step 211, the query response platform 102 may generate a query prompt corresponding to the user query. For example, the query response platform 102 may generate a query prompt based on historical query information (e.g., historical user queries, historical query responses, and/or the like) and the user query. In some examples, the query prompt may comprise the embedding corresponding to the user query (e.g., the embedding generated at step 208) and/or a plurality of embeddings corresponding to a subset of the historical query information. For example, the query prompt may comprise a subset of historical query information comprising text inputs, chat logs, photographic images, audio files, historical data logs, digital files, and/or other representations of information relevant to the user query. For example, the query prompt may comprise a subset of historical query information comprising representations of information such as, for example, market information reflecting economic activity associated with the user query, policy information corresponding to one or more regulatory entities associated with the user query, cybersecurity information associated with the user query, and/or other information.

At step 212, the query response platform 102 may cause a machine learning model to process the query prompt. For example, the query response platform 102 may cause the query response model to process the query prompt generated at step 211. For example, the query response platform 102 may cause the query response model to process the query prompt by applying natural language processing, natural language understanding, supervised machine supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques.

Figure 2D:
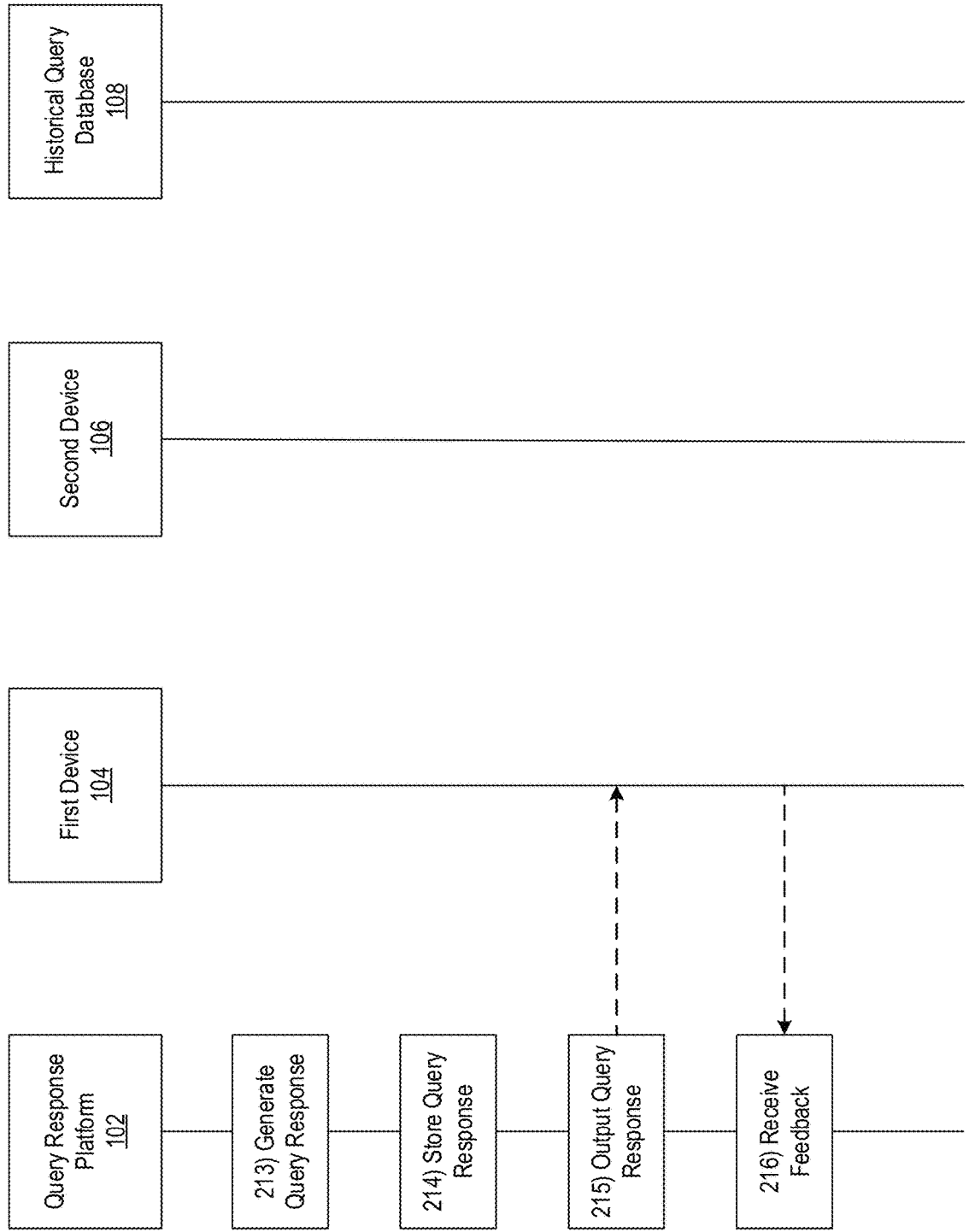

Referring to FIG. 2D, at step 213, the query response platform 102 may generate a query response. For example, the query response platform 102 may generate a query response based on inputting the query prompt into the query response model. In some examples, based on input of the query prompt, the query response platform 102 may cause the query response model to generate or output a query response (e.g., a text notification, an email, a chat response, and/or other query responses) comprising information responsive to the user query (e.g., market information, regulatory information, account information, and/or other information responsive to a user query). For example, based on input of a user query prompt corresponding to a user query requesting information of a level of risk associated with an economic sector (e.g., an industry, investment market, and/or the like), the query response model may generate a query response comprising a summary of regulations impacting the economic sector, historical growth rates associated with the economic sector, a summary of current events impacting the economic sector, and/or other information corresponding to the level of risk associated with the economic sector.

In generating a query response, the query response platform 102 may cause the query response model to access, review, and/or otherwise use one or more stored correlations previously used to train the query response model. In some examples, the query response platform 102 may cause the query response model to compare some or all of the information included in the query prompt to the one or more stored correlations corresponding to historical query prompts in order to generate the query response. In these examples, comparing the information included in the query prompt to the one or more stored correlations may cause the query response model to identify a historical query prompt that is similar to the query prompt inputted into the query response model. The query response platform 102 may, based on identifying the similar historical query prompt, cause the query response model to generate the query response based on a historical query response that, based on the stored correlation, matches the similar historical query prompt. For example, based on identifying a historical query prompt corresponding to a historical user query requesting information of a level of risk associated with the same economic sector as the query prompt inputted into the query response model, the query response model may generate a query response based on the historical query response matching the historical query prompt.

In some examples, the query response platform 102 may identify the similar historical query prompt based on a similarity score generated by the query response model based on the comparison of the information included in the query prompt inputted into the query response model to the one or more stored correlations. In some examples, the query response model may use one or more machine learning algorithms to generate the similarity score. For example, the query response platform 102 may have previously trained the query response model to employ a scoring algorithm to generate similarity scores based on stored correlations. For instance, the query response model may execute the scoring algorithm using the following constraints/parameters to compare the query prompt to historical query prompts associated with the one or more stored correlations:

$$\text{Similarity Score} = \frac{(\text{Number of Matched Parameters})}{(\text{Number of Compared Parameters})} * 100$$

In this example, the query response model may compare particular parameters of the query prompt inputted into the query response model against parameters of a given historical query prompt, based on stored correlations indicating the parameters of each given historical query prompt. The compared parameters may comprise an industry associated with the query prompt, a time frame associated with the query prompt, a category of request associated with the query prompt, and/or other parameters. For example, a query prompt may correspond to a user query requesting information related to, for example, the film industry, within a time period of the past five years, and specifying that the information be delivered in a visual representation. The scoring algorithm may produce a similarity score for a historical query prompt that matches three out of three of the parameters (e.g., the same industry, the same time period, and the same delivery format) that exceeds a similarity score produced, for example, for a historical query prompt that matches only two out of three of the parameters (e.g., a historical query prompt requesting information related to the film industry, within a time period of the past three years, and specifying that the information be delivered in a visual representation). The query response model may, based on comparing the parameters, simultaneously or near-simultaneously execute the example scoring algorithm to generate a similarity score comprising the quotient of the number of parameters that match, between the query prompt and the historical query prompt, and the total number of compared parameters, multiplied by one hundred. It should be understood that this is merely one illustrative example of a scoring algorithm that may be executed by the query response model and that additional and/or alternative algorithms may be used without departing from the scope of this disclosure.

At step 214, the query response platform 102 may store one or more query responses generated by the query response model?. The query response platform 102 may store the query responses by uploading and/or otherwise providing all of the information comprising the query responses to a long-term memory component (e.g., the historical query database 108, the long-term memory database 112e, and/or other long-term memory). In some instances, the query response platform 102 may store the query responses by causing the historical query database 108 and/or the long-term memory database 112e to generate a cell architecture comprising the query responses. In some instances, the query response platform 102 may store the query responses by causing a short-term memory component (e.g., vector cache and/or the like) to generate a cell architecture comprising the query responses. In some examples, the query response platform 102 may store the query responses by causing historical query database 108 and/or the long-term memory database 112e to generate a cell architecture comprising the query responses.

Figure 3:
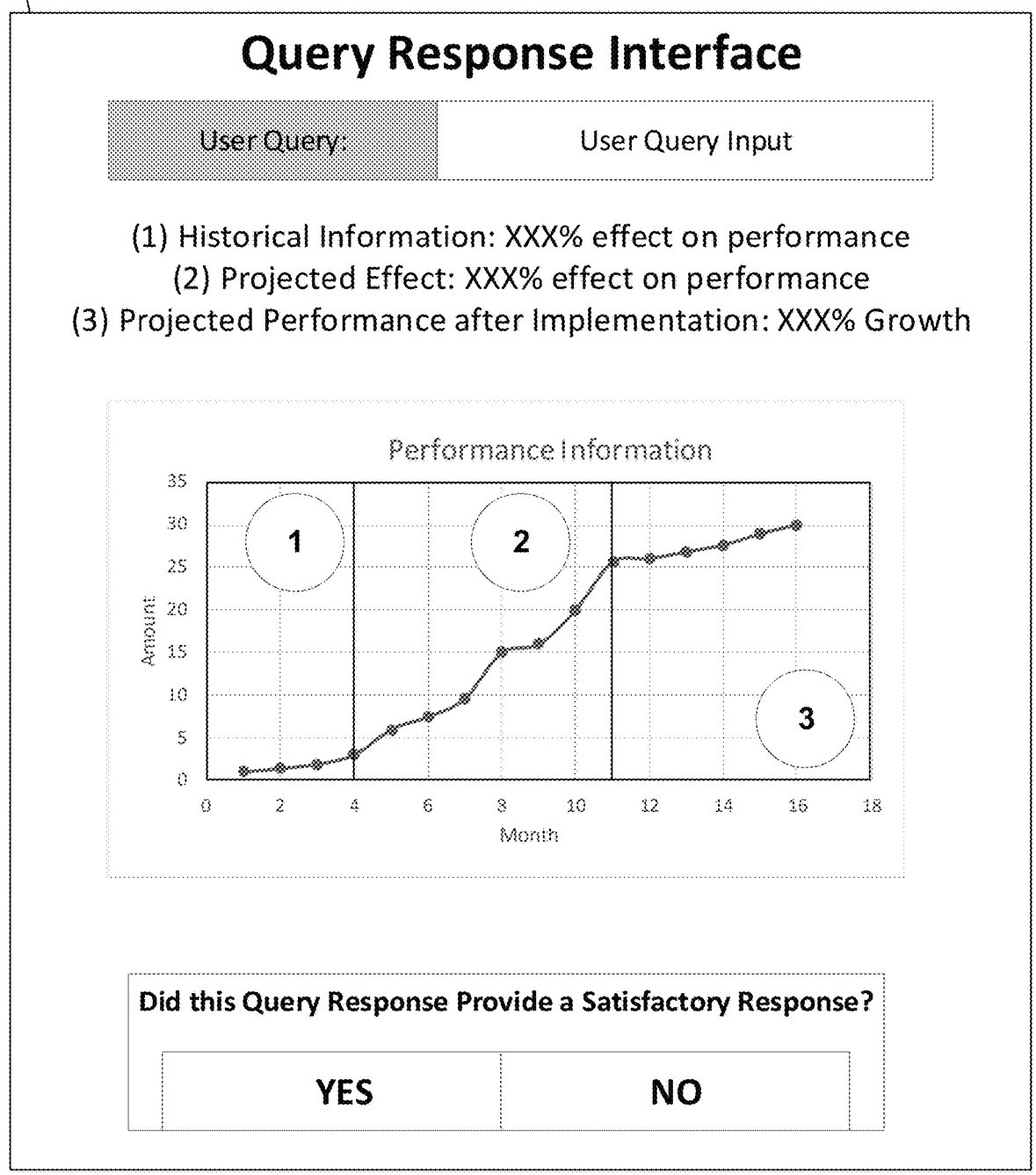
FIG. 3 depicts an illustrative graphical user interface generated as part of implementing a context-specific query response platform using large language models in accordance with one or more example arrangements.

At step 215, the query response platform 102 may output the query response. In some examples, in outputting the query response, the query response platform 102 may output and/or otherwise cause display of a user interface (e.g. on a display of user device 104). In some examples, in causing output of the user interface, the query response platform 102 may transmit and/or cause a display of a query response interface for notifying a user (e.g., a client of the enterprise organization associated with the query response platform 102, and/or other users) of context-specific query responses using large language models described herein. In displaying the query response interface, the query response platform 102 may cause the display of a query response interface similar to query response interface 300, which is illustrated in FIG. 3. For example, the query response platform 102 may output one or more instructions (via the communication interface 113 and while the second wireless data connection is established) to the first device 104, causing the first device 104 to display the query response interface 300.

Referring to FIG. 3, in some instances, the query response interface 300 may include information corresponding to the query response used to fulfill the user query described herein. For example, the query response interface 300 may include information such as a representation of the original user query that was sent/input by the user, a visual representation of information requested by the user query (e.g., an email, chat output, audio file, datalog and/or the like), a feedback response button, textbox, and/or other feedback response indicators, text outputs, chat logs, photographic images, audio files, digital files, and/or the like. The query response interface 300 may also display interface elements or selectable options requesting user input. For example, the query response interface 300 may display one or more of: an information entry field, a button or buttons, toggle or toggles, check box or boxes, and/or other interface elements. For example, as illustrated in FIG. 3, the interface elements may be one or more buttons the user might toggle or select to manually provide user feedback indicating whether the query response satisfied the user query. In some instances, based on receiving user input/feedback, the query response platform 102 may receive the user input/feedback as described with respect to FIG. 2D, at step 216.

Referring again to FIG. 2D, at step 216 the query response platform 102 may receive feedback (e.g., a Boolean status, indicators, and/or the like) indicating whether the query response satisfied the used query. For example, the query response platform 102 may receive user input indicating a status of the query response (e.g., whether the query response satisfies or does not satisfy the user query). The query response platform 102 may receive the status (e.g., feedback from a user device corresponding to whether the query response satisfies or does not satisfy the user query) from a client device, such as, for example, first device 104, and/or other devices (e.g., as described with respect to FIG. 3 herein). In these examples, the query response platform 102 may receive the feedback via the communication interface 113 and/or while the second wireless data connection is established.

Figure 2E:
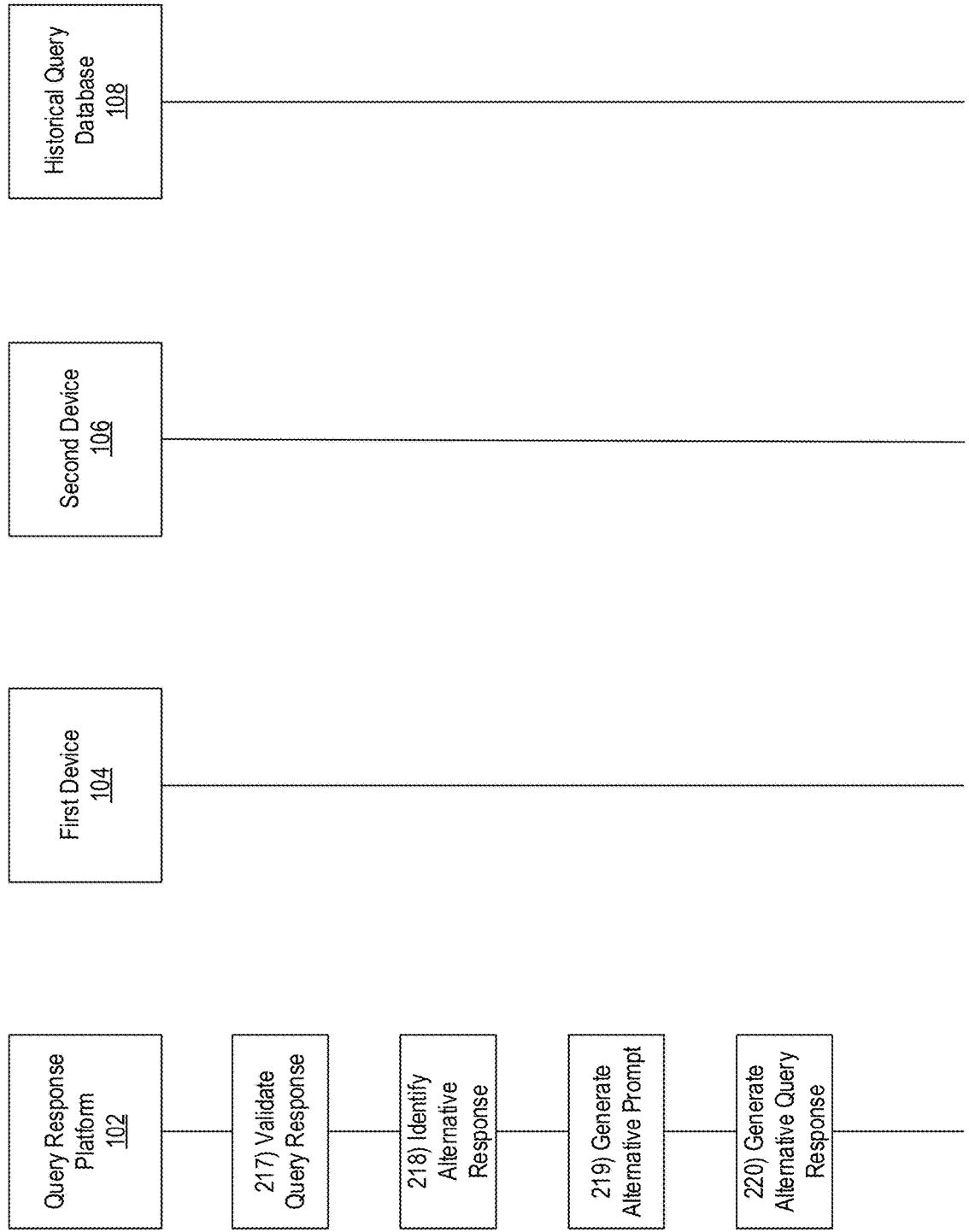

Referring to FIG. 2E, at step 217, the query response platform 102 may validate and/or otherwise identify the query response status received by the query response platform 102 (e.g., as described at step 216). In validating and/or otherwise identifying the query response status, the query response platform 102 may identify whether a status of the query response indicates that the query response satisfies the user query. For example, the query response platform may identify whether user feedback indicates the query response satisfied the user query. For example, the user feedback may be received via the graphical interface buttons or toggles (e.g. a user manually clicking feedback buttons) indicating whether the query response satisfied the user. In some examples, based on identifying that the status of the user query indicates that the query response satisfies the user query, the query response platform 102 may proceed to step 226 and store the query response. In some examples, based on identifying that the status of the query response indicates that the query response does not satisfy the user query, the query response platform 102 may proceed to step 218 and identify an alternative query response. In some examples, the query response platform 102 may identify the status of the query response by performing a range check, pattern matching, data type validation, and/or other data validation techniques.

At step 218, based on identifying that the status of the query response indicates that the query response does not satisfy the user query, the query response platform 102 may identify an alternative query response. For example, the query response platform 102 may search one or more repositories of historical user queries and historical query responses (e.g., a long-term memory component, such as the historical query database 108, the long-term memory database 112e, and/or other long-term memory components) to identify whether an alternative query response that answers the user query has previously been generated and/or stored by the query response platform 102. For example, the query response outputted at step 215 may be one of multiple query responses that correspond to the user query. In some examples, the query response model may have, based on comparing the query prompt to a plurality of stored correlations, generated a plurality of query responses with the same or similar similarity scores. In these examples, the query response platform 102 may identify the query response corresponding to the next highest similarity score as an alternative query response. Additionally or alternatively, in some examples, the query response platform 102 may have previously identified a plurality of historical query responses that answers the user query (e.g., as described at step 210). In these examples, the query response platform 102 may utilize the database search module 112c and/or other programs to search the query responses stored at the one or more repositories (e.g., as described at step 210). The query response platform 102 may identify, as the alternative query response, a stored historical query response corresponding to the user query. Based on identifying an alternative query response, the query response platform 102 may proceed to step 221 and determine whether manual review is needed. In some examples, the query response platform 102 may fail to identify an alternative query response that satisfies the user query. In these examples, based on failing to identify an alternative query response, the query response platform 102 may proceed to step 219 and generate a query prompt.

At step 219, the query response platform 102 may generate an alternative query prompt. For example, the query response platform 102 may generate an alternative query prompt by repeating some or all of the functions used to generate the query prompt (e.g., as described at step 211). In these examples, the query response platform 102 may modify one or more parameters for generating the query prompt, dismiss, from a set of generated query prompts, the query prompt corresponding to the query response, and/or otherwise ensure the alternative query prompt differs from the query prompt.

At step 220, the query response platform 102 may generate an alternative query response, by inputting the alternative query prompt to the query response model to output an alternative query response. For example, the query response platform 102 may generate an alternative query response by repeating some or all of the functions used to generate the query response (e.g., as described at steps 212-213). In some examples, the alternative query response may be generated by inputting the alternative query response into the query response platform (e.g., machine learning model). In these examples, the query response platform 102 may modify one or more parameters for generating the query response, dismiss, from a set of generated query responses, the query response corresponding to the user query, and/or otherwise ensure the alternative query response differs from the query response.

For example, the query response platform 102 may generate an alternative query response based on historical query information and the user query by applying natural language processing, natural language understanding, supervised machine supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques as applied via the query response model. In generating an alternative query response, the query response platform may identify correlations corresponding to user queries, correlations corresponding to historical query information, and/or other historical information as discussed above with respect to execution of the query response model.

Referring to FIG. 2F, at step 221, the query response platform 102 may identify whether manual review is needed. In some examples, the query response platform may identify whether an identified alternative query response contradicts historical query responses stored in a long-term memory component (e.g., historical query database 108, or the like). In identifying whether the alternative query response contradicts historical query responses, the query response platform 102 may receive information correlated to the alternative query response's effect on the historical query information such as, for example, historical query information stored in historical query database 108. In some examples, the alternative query response may override, overwrite, and/or otherwise modify historical query responses stored in a long-term memory component such as, for example, long-term memory database 112*c*. Accordingly, the query response platform 102 may ensure the integrity of historical user queries, historical query responses, and/or other historical query information. Based on identifying that the alternative response does not contradict any historical query responses, the query response platform 102 may identify that manual review is not necessary and may proceed to step 225. Based on identifying that the alternative response does contradict one or more historical query responses, the query response platform 102 may proceed to step 222.

Additionally or alternatively, in some examples, based on failing to identify an alternative query response, the query response platform 102 may identify that manual review is necessary or advantageous to provide a satisfactory query response. In these examples, the query response platform may automatically proceed to step 222 and establish a connection with the second device 106 (e.g., in preparation for sending the user query for manual review).

At step 222, the query response platform 102 may establish a connection with a second user device such as, for example, second device 106. For example, the query response platform 102 may establish a third wireless data connection with the second device 106 to link the second device 106 to the query response platform 102 (e.g., in preparation for receiving a modified query response). In some instances, the query response platform 102 may identify whether or not a connection is already established with the second device 106. If a connection is already established with the second device 106, the query response platform 102 might not re-establish the connection. If a connection is not yet established with the second device 106, the query response platform 102 may establish the third wireless data connection as described herein.

At step 223, the query response platform 102 may output query information for manual review. For example, the query response platform 102 may output (e.g., send, transmit, or the like), to second device 106, the status of the user query, the user query, and/or other query information correlated to the user query. In some examples, the query response platform 102 may output the query information in a format accessible by multiple users (who may, e.g., employees of an enterprise organization such as a financial institution). In some examples, based on outputting the query information for manual review, one or more employees of the enterprise organization may generate a modified query response (e.g., based on manual review of the user query). Accordingly, methods described herein may ensure accurate responses to the user query are provided.

At step 224, the query response platform 102 may receive a modified query response. For example, the query response platform 102 may receive the modified query response from the second device 106. In some examples, the modified query response may comprise, for example, a text output, an audio file, a graphical representation, and/or other modified query responses.

Figure 2G:
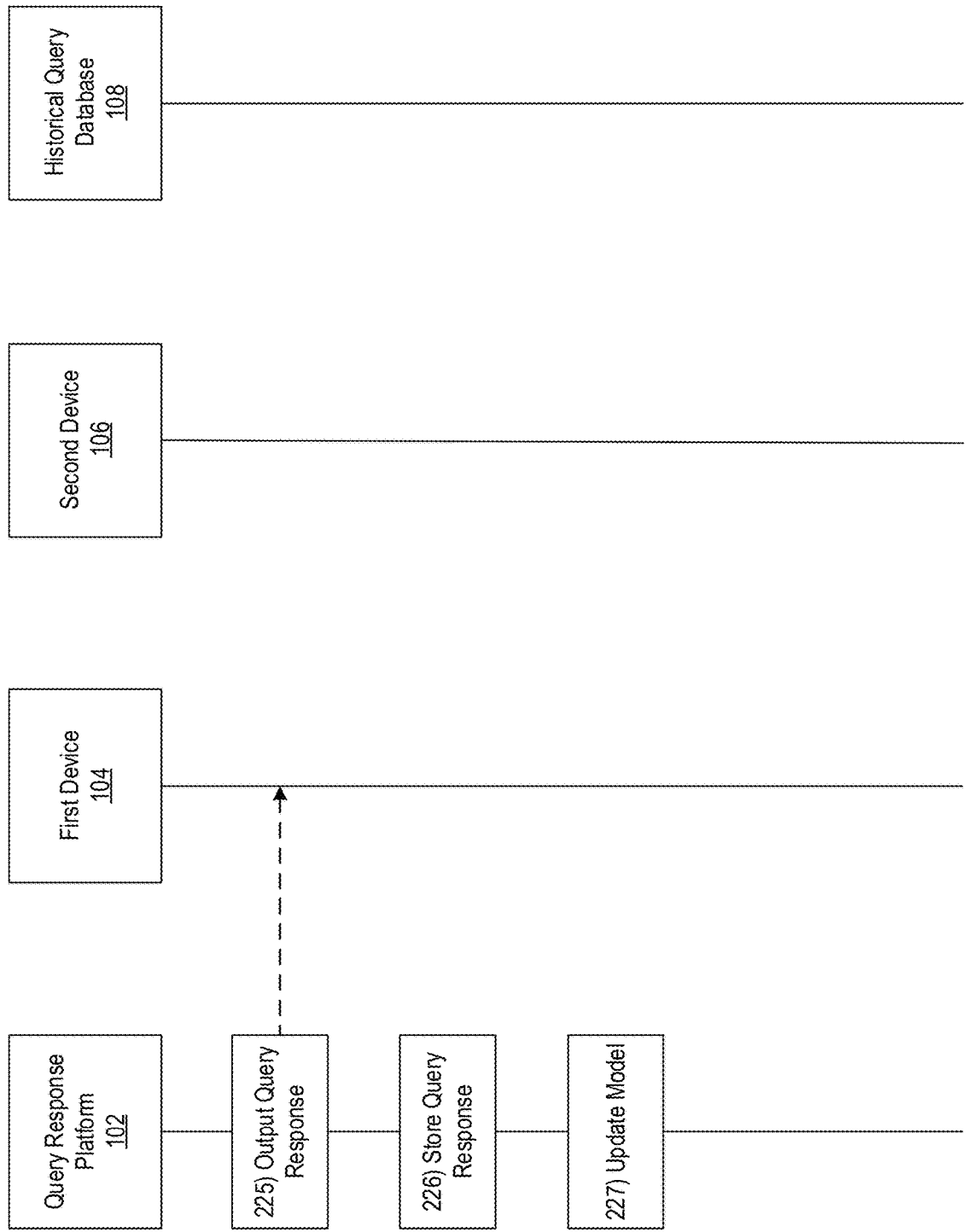

Referring to FIG. 2G, at step 225 the query response platform 102 may output a query response. For example, the query response platform 102 may output, to the first device 104, the alternative query response identified at step 218. Additionally or alternatively, in some examples, the query response platform 102 may output, to the first device 104, the modified query response received at step 225. In some examples, the query response platform 102 may cause the query response platform to display a graphical interface such as, for example, the query response interface 300 in FIG. 3.

At step 226, the query response platform 102 may store a query response to a long-term memory component. For example, the query response platform 102 may store the alternative query response. Also or alternatively, the query response platform 102 may store the modified query response. In storing the query response, the query response platform 102 may update a repository of query responses that may be used, for example, to train query response models, provide alternative query responses, and/or perform other functions.

In some examples, the query response platform may store the query response based on one or more categories, indicators, and/or the like. The query response platform 102 may cause a database such as, for example, the historical query database 108 to generate a cell architecture comprising the query response. In generating a cell architecture comprising the query response, the database may utilize indicators, categories, and/or the like to direct the storage of the query response.

At step 227, the query response platform 102 may refine, modify or otherwise update the query response model. For example, the query response platform 102 may update the query response model based on the user query, query prompt, query status, and/or one or more query responses (e.g., query response generated by the query response model at step 213, the alternative query response, and/or the modified query response). For example, the query response platform 102 may input the user query, query prompt, query status, and/or one or more query responses as an additional training set and/or to refine the query response model. By inputting the user query, query prompt, query status, and/or one or more query responses into the query response model, the query response platform 102 may create an iterative feedback loop that may continuously and dynamically refine the query response model to improve its accuracy. By inputting the user query, query prompt, query status, and/or one or more query responses into the query response model, the query response platform 102 may cause the query response model to update one or more stored correlations based on the information. For example, the query response platform 102 may cause the query response model to store new correlations and/or update existing correlations such that the query response model may generate query responses for future user query requests, with the same or similar context, in future iterations of the feedback loop.

Additionally or alternatively, in some examples, the query response platform 102 may refine, modify or otherwise update the query response model based on industry information that may be relevant to future user queries. For example, the query response platform 102 may update the query response model based on industry information received from an administrator device (e.g., the second device 106) and/or other devices. The industry information may comprise market information reflecting economic activity in one or more markets, policy information corresponding to one or more regulatory entities (e.g., government agencies, cooperative organizations, or the like), cybersecurity information corresponding to the query response platform 102, and/or other industry information. In these examples, the query response platform 102 may update the query response model by adding one or more stored correlations corresponding to the industry information. For example, the query response platform 102 may cause the query response model to add stored correlations between portions of the industry information and related user queries. For instance, the query response platform 102 may cause the query response model to add a stored correlation between policy information indicating a new regulation proposed by a rulemaking authority and one or more historical user queries requesting information affected by the new regulation. By updating the query response model based on industry information, the query response platform 102 may continuously or near-continuously improve the accuracy and/or quality of query responses provided by the query response model.

Figure 4A:
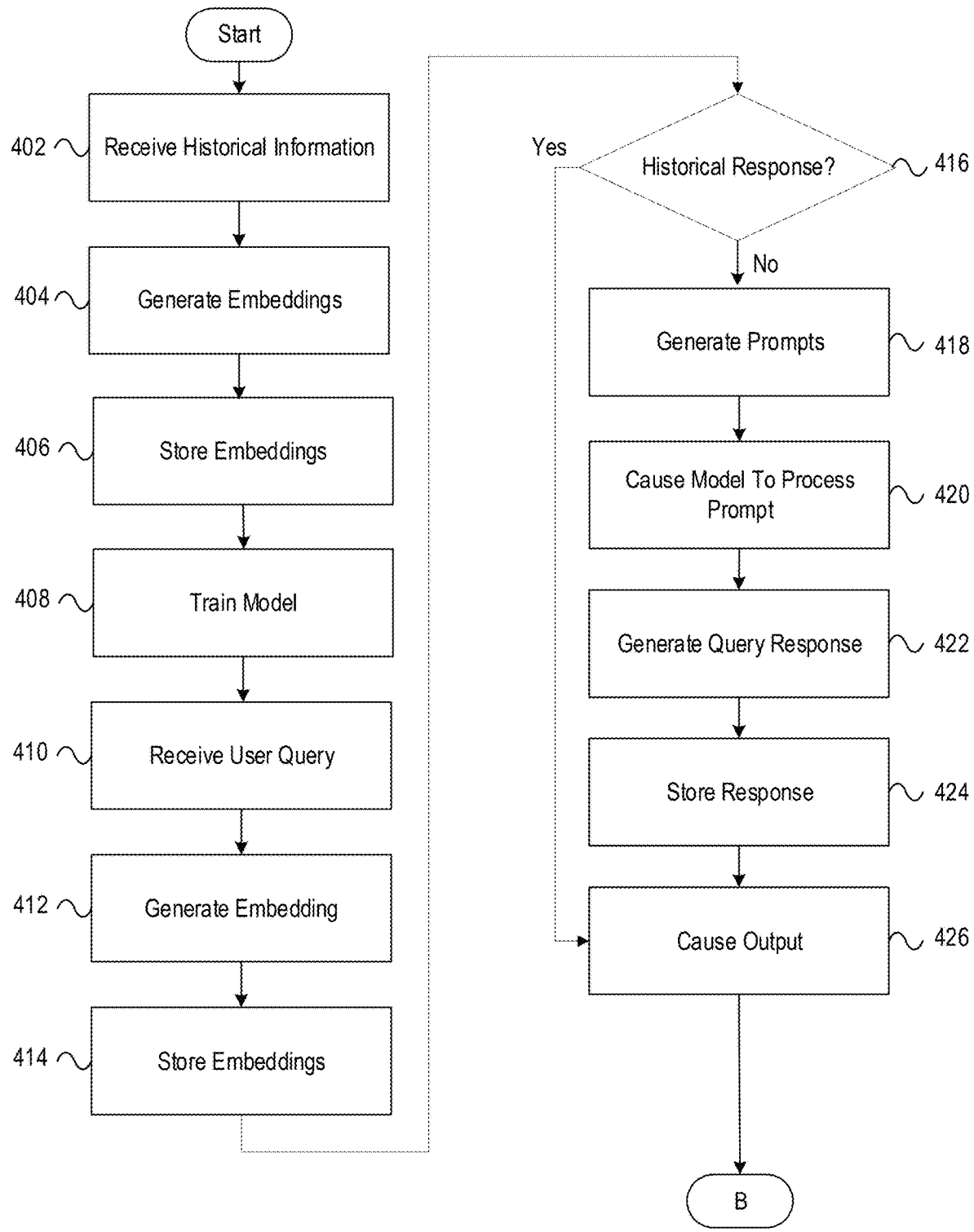
FIGS. 4A-4B depict an illustrative method for a context-specific query response platform using large language models in accordance with one or more example arrangements.
Figure 4B:
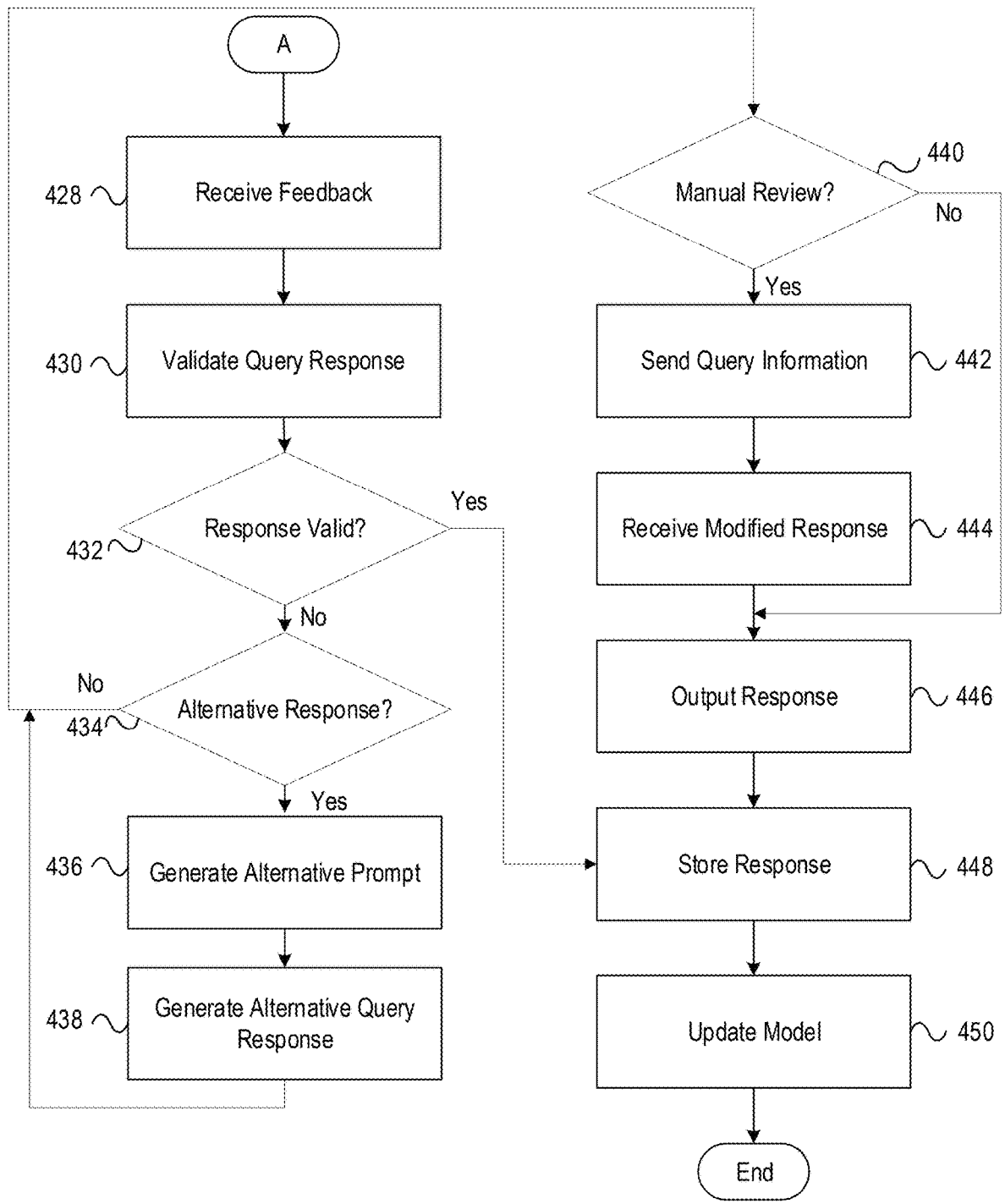

FIGS. 4A-4B depict an illustrative method for providing a context-specific query response platform using large language models. Referring to FIG. 4A, at step 402, a computing platform having at least one processor, a communication interface, and memory may receive historical query information (e.g., historical user queries, historical query prompts, and/or historical query responses). At step 404, the computing platform may generate embeddings. For example, the computing platform may generate embedding based on the historical query information. At step 406, the computing platform may store the embeddings. For example, the computing platform may store the embeddings to a long-term memory component. At step 408, the computing platform may train a machine learning model. For example, the computing platform may train a query response model to output query responses based on input of a query prompt. At step 410, the computing platform may receive a user query. For example, the computing platform may receive a user query comprising text, audio files, data logs, and/or other user inputs. At step 412, the computing platform may generate an embedding. For example, the embedding may be comprised of query information corresponding to the user query. At step 414, the computing platform may store the embedding. For example, the computing platform may store the embedding to a long-term memory component.

At step 416, the computing platform may identify whether a historical response exists. If a historical response exists, the computing platform may proceed to step 426. If no historical response exists, the computing platform may proceed to step 418. At step 418, the computing platform may generate a query prompt. At step 420, the computing platform may cause the model to process the prompt. For example, the computing platform may utilize or execute a large language model (e.g., query response model) to process the query prompt. At step 422 the computing platform may generate a query response. For example, the computing platform may cause a large language model (e.g., the query response model) to output a query response based on the input query prompt. At step 426, the computing platform may cause output of a query response. Based on outputting the query response, the computing platform may proceed to step 428, as described at FIG. 4B

Referring to FIG. 4B, at step 428 the computing platform may receive feedback corresponding to the query response. For example, the computing platform may receive feedback corresponding to the query response indicating whether the query response was satisfactory. At step 430, the computing platform may validate the query response. At step 432, the computing platform may identify whether the query response is valid based on the query feedback. If the computing platform identifies that the query response is valid, the computing platform may proceed to step 448. If the computing platform identifies that the query response is not valid, the computing platform may proceed to step 434. At step 434, the computing platform may identify whether an alternative query response exists. If an alternative response exists, the computing platform may continue to step 436. If an alternative response does not exist, the computing platform may proceed to step 440. At step 436, the computing platform may generate an alternative query prompt. At step 438, the computing platform may generate an alternative query response. For example, the computing platform may cause a large language model to generate an alternative query response based on the alternative query prompt.

At step 440, the computing platform may identify whether manual review is necessary. For example, the computing platform may identify a need for manual review when the alternative query response contradicts a historical query response. If manual review is not necessary, the computing platform may proceed to step 446. If manual review is necessary, the computing platform may proceed to step 442. At step 442, the computing platform may send the query information to a second device such as, for example, an administrator device. For example, the computing platform may send the query information (e.g., user query, query response, query feedback and/or the like) to the second device such as, for example, second device 106. At step 444, the computing platform may receive from the second device 106 a modified query response. At step 446, the computing platform may cause a communication interface to output the modified query response to the first device. For example, the computing platform may cause a communication interface to out a modified query response to the first device 104. At step 448, the computing platform may store the modified query response to a long-term memory component. For example, the computing platform may cause a database to store in a cell architecture query information (e.g., user query, query response, modified response, alternative query response, and/or the like). At step 450, the computing platform may update the query response model.

One or more aspects of the disclosure may be embodied in computer-usable data or computer-executable instructions, such as in one or more program modules, executed by one or more computers or other platforms to perform the operations described herein. Generally, program modules include routines, programs, objects, components, data structures, and the like that perform particular operations or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various arrangements. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative arrangements, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative arrangements thereof. Numerous other arrangements, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   a memory storing computer-readable instructions that, when executed by the at least one processor, configure the computing platform to:
      train, based on historical query information, a query response model, wherein training the query response model configures the query response model to output query responses based on input of query prompts;
      receive, from a user device, a user query;
      generate, based on one or more historical embeddings, an embedding corresponding to the user query;
      generate a query prompt corresponding to the user query, wherein the query prompt comprises:
         the embedding corresponding to the user query; and
         a plurality of embeddings corresponding to a subset of the historical query information;
      execute, using as inputs the query prompts, the query response model to output a query response;
      send, to the user device, the query response, wherein sending the query response to the user device causes display of a user interface including the query response on a display of the user device;
      identify, based on sending the query response, a status of the query response indicating whether the query response satisfies the user query, and in response:
         based on identifying that the query response satisfies the user query, store, to a long-term memory component, the query response, or
         based on identifying that the query response does not satisfy the user query, output an alternative query response; and
      update, based on the query response and the status of the query response, the query response model.

2. The computing platform of claim 1, wherein the memory stores additional computer-readable instructions that, when executed by at least one processor, further configure the computing platform to:
   output, to a second user device and based on identifying that the status of the query response indicates that the query response does not satisfy the user query, the query prompt;
   receive, from the second user device, a modified query response; and
   output, to the user device, the modified query response.

3. The computing platform of claim 1, wherein the memory stores additional computer-readable instructions that, when executed by the at least one processor, further configure the computing platform to:
   identify, based on identifying that the status of the query response indicates that the query response does not satisfy the user query, the alternative query response,
   wherein identifying the alternative query response comprises selecting, from one or more historical query responses stored at the long-term memory component, a historical query response corresponding to the user query.

4. The computing platform of claim 1, wherein the memory stores additional computer-readable instructions that, when executed by at least one processor, further configure the computing platform to:
   maintain, at the long-term memory component, one or more historical query responses,
   wherein executing the query response model to output the query response comprises identifying, based on one or more stored correlations to the one or more historical query responses, a historical query response corresponding to the user query.

5. The computing platform of claim 1, wherein the subset of the historical query information comprises one or more of the following:
   text inputs,
   chat logs,
   photographic images,
   audio files,
   historical data logs, or
   digital files.

6. The computing platform of claim 1, wherein the user query comprises one or more of the following:
   text inputs,
   chat logs, photographic images,
audio files,
historical data logs, or
digital files.

7. The computing platform of claim 1, wherein the memory stores additional computer-readable instructions that, when executed by at least one processor, further configure the computing platform to:
  maintain, at the long-term memory component:
    one or more historical embeddings corresponding to historical user queries, and
    one or more historical query prompts,
  wherein generating the embedding corresponding to the user query comprises selecting, from the one or more historical embeddings, a historical embedding corresponding to the user query, and
  wherein generating the query prompt comprises selecting, from the one or more historical query prompts, a query prompt corresponding to the historical embedding.

8. The computing platform of claim 1, wherein the memory stores additional computer-readable instructions that, when executed by at least one processor, further configure the computing platform to:
  generate, based on the historical query information, the one or more historical embeddings;
  identify, based on the one or more historical embeddings, one or more categories of historical query information; and
  store, at a long-term memory component and based on the one or more categories of historical query information, one or more correlations between the one or more categories and the one or more historical embeddings.

9. The computing platform of claim 1, wherein identifying the status of the query response comprises:
  receiving, from the user device and via the user interface, user feedback; and
  identifying, based on the user feedback, whether the query response satisfies the user query.

10. The computing platform of claim 1, wherein the memory stores additional computer-readable instructions that, when executed by at least one processor, further configure the computing platform to:
  receive, from one or more sources of industry information, wherein the industry information comprises one or more of:
    policy information corresponding to one or more regulatory entities, or
    cybersecurity information; and
  update, based on the industry information, the query response model.

11. The computing platform of claim 1, wherein the query response comprises at least one of:
  information responsive to the user query, wherein the information responsive to the user query comprises at least one of:
    account information,
    regulatory information, or
    asset information, or
  a visual representation of the query response, wherein the visual representation comprises:
    a text output;
    an email;
    a chat response;
    a graphical representation;
    an audio file; or
    a data log.

12. A method comprising:
at a computing device comprising at least one processor, a communication interface, and memory:
  training, based on historical query information, a query response model, wherein training the query response model configures the query response model to output query responses based on input of query prompts;
  receiving, from a user device, a user query;
  generating, based on one or more historical embeddings, an embedding corresponding to the user query;
  generating a query prompt corresponding to the user query, wherein the query prompt comprises:
    the embedding corresponding to the user query; and
    a plurality of embeddings corresponding to a subset of the historical query information;
  executing, using as inputs the query prompts, the query response model to output a query response;
  sending, to the user device, the query response, wherein sending the query response to the user device causes display of a user interface including the query response on a display of the user device;
  identifying, based on sending the query response, a status of the query response indicating whether the query response satisfies the user query, and in response:
    based on identifying that the query response satisfies the user query, store, to a long-term memory component, the query response, or
    based on identifying that the query response does not satisfy the user query, output an alternative query response; and
  updating, based on the query response and the status of the query response, the query response model.

13. The method of claim 12, further comprising:
maintaining, at the long-term memory component, one or more historical query responses,
wherein executing the query response model to output the query response comprises identifying, based on one or more stored correlations to the one or more historical query responses, a historical query response corresponding to the user query.

14. The method of claim 12, further comprising:
outputting, to a second user device and based on identifying that the status of the query response indicates that the query response does not satisfy the user query, the query prompt;
receiving, from the second user device, a modified query response; and
outputting, to the user device, the modified query response.

15. The method of claim 12, further comprising:
identifying, based on identifying that the status of the query response indicates that the query response does not satisfy the user query, the alternative query response,
wherein identifying the alternative query response comprises selecting, from one or more historical query responses stored at the long-term memory component, a historical query response corresponding to the user query.

16. The method of claim 12, further comprising:
receiving, from one or more sources of industry information, wherein the industry information comprises one or more of:
  policy information corresponding to one or more regulatory entities, or cybersecurity information; and updating, based on the industry information, the query response model.

17. One or more non-transitory computer-readable media storing instructions that, when executed by a computing platform comprising at least one processor, a communication interface, and memory, cause the computing platform to:
- train, based on historical query information, a query response model, wherein training the query response model configures the query response model to output query responses based on input of query prompts;
- receive, from a user device, a user query;
- generate, based on one or more historical embeddings, an embedding corresponding to the user query;
- generate a query prompt corresponding to the user query, wherein the query prompt comprises:
  - the embedding corresponding to the user query; and
  - a plurality of embeddings corresponding to a subset of the historical query information;
- execute, using as inputs the query prompts, the query response model to output a query response;
- send, to the user device, the query response, wherein sending the query response to the user device causes display of a user interface including the query response on a display of the user device;
- identify, based on sending the query response, a status of the query response indicating whether the query response satisfies the user query, and in response:
  - based on identifying that the query response satisfies the user query, store, to a long-term memory component, the query response, or
  - based on identifying that the query response does not satisfy the user query, output an alternative query response; and
- update, based on the query response and the status of the query response, the query response model.

18. The one or more non-transitory computer-readable media of claim 17, wherein the instructions, when executed, further cause the computing platform to:
- maintain, at the long-term memory component, one or more historical query responses,
- wherein executing the query response model to output the query response comprises identifying, based on one or more stored correlations to the one or more historical query responses, a historical query response corresponding to the user query.

19. The one or more non-transitory computer-readable media of claim 17, wherein the instructions, when executed, further cause the computing platform to:
- output, to a second user device and based on identifying that the status of the query response indicates that the query response does not satisfy the user query, the query prompt;
- receive, from the second user device, a modified query response; and
- output, to the user device, the modified query response.

20. The one or more non-transitory computer-readable media of claim 17, wherein the instructions, when executed, further cause the computing platform to:
- identify, based on identifying that the status of the query response indicates that the query response does not satisfy the user query, the alternative query response,
- wherein identifying the alternative query response comprises selecting, from one or more historical query responses stored at the long-term memory component, a historical query response corresponding to the user query.

* * * * *